United States Patent [19]

Bailes

[11] Patent Number: 5,580,464

[45] Date of Patent: Dec. 3, 1996

[54] RESOLUTION OF EMULSIONS

[75] Inventor: Philip J. Bailes, Baildon, United Kingdom

[73] Assignee: Bradford University, Bradford, United Kingdom

[21] Appl. No.: 302,716

[22] PCT Filed: Mar. 24, 1993

[86] PCT No.: PCT/GB93/00601

§ 371 Date: Oct. 18, 1994

§ 102(e) Date: Oct. 18, 1994

[87] PCT Pub. No.: WO93/18836

PCT Pub. Date: Sep. 30, 1993

[30] Foreign Application Priority Data

Mar. 24, 1992 [GB] United Kingdom ............... 9206335

[51] Int. Cl.$^6$ .................. B01D 17/04; B01D 17/035; B01D 17/06

[52] U.S. Cl. ............... 204/564; 210/748; 210/708; 204/568

[58] Field of Search .................. 210/703, 706, 210/708, 748, 198.1, 205, 220, 221.2, 243; 204/188, 189, 190, 302

[56] References Cited

U.S. PATENT DOCUMENTS

| | | | |
|---|---|---|---|
| 2,364,118 | 12/1944 | Wolfe | 204/188 |
| 2,855,356 | 10/1958 | Stenzel | 204/188 |
| 3,891,537 | 6/1975 | Tokumoto | 204/189 |
| 4,194,972 | 3/1980 | Weintraub et al. | 210/708 |
| 4,198,300 | 4/1980 | Williams | 210/703 |
| 4,251,361 | 2/1981 | Grimsley | 210/708 |
| 4,252,631 | 2/1981 | Hovarongkura et al. | 204/302 |
| 4,601,834 | 7/1986 | Bailes | 210/748 |
| 4,722,787 | 2/1988 | Fombarcet et al. | 210/243 |
| 4,919,777 | 4/1990 | Bull | 204/188 |
| 5,211,856 | 5/1993 | Shen | 210/220 |

FOREIGN PATENT DOCUMENTS 1494922 7/1989 U.S.S.R. .

Primary Examiner—Peter A. Hruskoci
Assistant Examiner—Theodore M. Green
Attorney, Agent, or Firm—Edwin D. Schindler

[57] ABSTRACT

A method and apparatus for separating the components of an emulsion comprising an electrically conductive component dispersed in a continuous phase of a substantially electrically insulating component, for instance, a water-in-oil emulsion. The method includes the steps of introducing bubbles of an electrically insulating gas into the emulsion, whilst simultaneously applying an electric or electrostatic field across the emulsion.

8 Claims, 1 Drawing Sheet

RESOLUTION OF EMULSIONS

FIELD OF THE INVENTION

This invention relates to a method and apparatus for separating emulsions, in particular water-in-oil emulsions, into their component phases.

BACKGROUND OF THE INVENTION

Existing techniques whereby a water-in-oil emulsion may be resolved into its constituent phases make use of chemical and physical means for achieving the resolution.

The need for an emulsion breaking operation may arise in connection with a wide variety of processes. For example, in the production of crude oil at the well-head, where saline formation water is present as fine stable droplets in the oil coming to the surface, it is necessary to break the emulsion in order to dehydrate the oil.

In other cases, it may be essential to recover the components of an emulsion after it has been deliberately created for a specific purpose. This occurs in processes using emulsion liquid membrane technology where, for instance, a very stable water-in-oil emulsion is used to treat an aqueous effluent feed stream to remove an impurity. The species to be removed from the aqueous feed stream transfers through the outer oil phase of the emulsion into the water droplets or internal phase of the emulsion. To encourage this mass transfer to occur it is necessary to have some appropriate chemical or physical driving force. A simple example of such a process is the extraction of ammonia from an effluent water into an emulsion of sulphuric acid in kerosene.

A crucial feature of the economics of processes that employ emulsion liquid membranes concerns the ability to re-use the oil phase repeatedly. Ecohomic viability depends on being able to break the used emulsion speedily to remove the spent internal phase in bulk and recycle the oil phase to make fresh emulsion for re-use.

In the oil industry, crude oil emulsions that are slow to resolve using a purely physical method such as gravity separation, can often be treated with chemical additives which serve to destabilise the emulsion. However, the latter course of action is not feasible for liquid membrane emulsions. Here the desire to recreate a stable emulsion using the separated oil phase mitigates against the use of chemical demulsifiers. In the case of liquid membrane emulsions it is therefore necessary to consider the use of physical methods alone to speed up the separation of an emulsion.

In general, the resolution of emulsions requires that the small droplets of the dispersed (internal) phase coalesce together, until they become large enough to be removed easily from the continuous phase. Where the densities of the two phases are different, the denser phase simply gravitates from the emulsion and, given enough time, the two phases can be separated sufficiently for each to be drawn off. The time required for this separation is reflected by the size of the settling tanks which are typically required. These may be very large and may contain a large inventory of expensive liquids. In addition, the phase separation step may be the slowest stage of a more extensive process and therefore limit the throughput of the overall process.

During the resolution of a water-in-oil emulsion, those droplets that have grown by coalescence must gravitate through the emulsion to reach the bulk interface between the separated water layer and the unseparated emulsion. The viscosity of the emulsion tends to be high, especially for liquid membrane emulsions. This hinders the passage of the water droplets and they can be very slow to reach the bulk interface.

One method that has proved useful specifically for enhancing the rate of separation of a water-in-oil emulsion is to subject the emulsion to an applied high voltage gradient. The electric field assists the process of phase separation by promoting coalescence between the water droplets in the emulsion. Several possible mechanisms for electrically aided coalescence have been identified [Waterman, L. C. (1965) Chem. Eng. Progress, vol 61, (10), 51], all of which rely upon the attraction of opposite charges on adjacent droplets to cause an increased incidence of collision followed by coalescence. The larger droplets produced by this process gravitate much more quickly to the bulk interface than their much smaller antecedents could do when under the same gravitational field.

Many different types of electric field have been shown to be effective for emulsion resolution, including: AC fields [Cottrell, F. G. (1911) U.S. Pat. No 987 114, March]; pulsed AC fields [Wolfe, K. M. (1944) U.S. Pat. No. 2,364,118]; DC fields [Siebert, F. M. and Brady, J. D. (1919) U.S. Pat. No. 1,290,369, January]; and pulsed DC fields [Stenzel, R. W. (1958) U.S. Pat. No. 2,855,356, October].

A particular feature of some oil field emulsions and most liquid membrane emulsions is that the water content of the emulsion may be 20% or more. Under such circumstances it is often impossible to apply the desired electric field by simply passing the emulsion between metal electrodes because the presence of a large number of aqueous phase droplets tends to cause an electrical short-circuit between the electrodes. This problem can be overcome by coating the high voltage electrode in a layer of insulation, so that those conduction paths that do develop only cause a localised diminution of the electric field rather than a complete collapse of the field throughout the inter-electrode region.

The potential difference that must be sacrificed when introducing a layer of insulation between the high voltage electrode and the emulsion may be minimised by operating under pulsed voltage conditions. At optimum frequency, pulsed DC fields have been shown to be particularly good for promoting coalescence when the high voltage electrode is coated with insulation [Bailes, P. J. and Larkai, S. K. L. (1986) U.S. Pat. No. 4,601,834, July]. Experimental evidence suggests that best performance is achieved when the emulsion to be treated flows in close proximity to the insulation coated electrode [Bailes, P. J. and Larkai, S. K. L., Proceedings of the International Solvent Extraction Conference 1990 (Kyoto) (Process Metallurgy, Vol 7b, p1411, publd. Elsevier Science 1992)]. It follows from this that the larger the electrode area in contact with the emulsion the better.

The present invention aims to provide a method and apparatus for separating the components of an emulsion, which can allow improved separation rates to be achieved. The invention also provides a novel method of effectively using insulated electrode surfaces. In practice, the new method works in an unexpected way causing another beneficial effect which acts synergistically to bring about a substantial improvement in the rate of emulsion resolution.

STATEMENT OF THE INVENTION

According to a first aspect of the present invention there is provided a method for separating the components of an emulsion comprising an electrically conductive component dispersed in a continuous phase of a substantially electrically insulating component, the method comprising the step of introducing bubbles of an electrically insulating gas into the emulsion, whilst simultaneously applying an electric or electrostatic field across the emulsion.

The types of emulsion which can be separated using this method include water-in-oil emulsions, in which an electrically conductive aqueous phase component is dispersed in a continuous organic phase component which is electrically insulating. The continuous phase must be substantially non-conductive, so as to allow an electric field to be established in it.

The method thus depends upon the use of electrically insulating gas bubbles, which are injected into an emulsion whilst it is under the influence of an applied electric or electrostatic field. It is considered that these bubbles essentially create a large gas:continuous phase dielectric interface in the emulsion, at which electric charge will accumulate. This surface charge then promotes coalescence between adjacent droplets of the dispersed phase in the continuous phase. In this way, the gas bubbles effectively serve as electrodes, and their presence ensures that more of the emulsion is exposed to the applied electric field. The result is that introduction of gas bubbles considerably enhances the rate of emulsion resolution, compared to the rate which would be observed in the absence of gas introduction.

The second benefit of introducing gas into the emulsion stems from the fact that gas bubbles moving through the emulsion appear to form channels through it. It has been discovered that these channels help to provide pathways down which coalesced droplets of the dispersed phase can move relatively quickly, experiencing much reduced hindrance as they pass through the emulsion towards the bulk interface. The presence of the gas bubbles thus improves not only the rate of inter-droplet coalescence but also the rate at which the coalesced droplets gravitate from the emulsion.

The electrically insulating gas is preferably air or some other similarly inert gas.

The electric or electrostatic field is preferably applied by means of one or more pairs of electrodes. More preferably the field is a unidirectional electrostatic field applied between a relatively high voltage electrode and a relatively low voltage electrode. The high voltage electrode is preferably separated from the emulsion by a layer or electrically insulating material.

Preferably the voltage applied to the relatively high voltage electrode is between 10 and 20 kV. The voltage across the electrodes is preferably pulsed at a frequency of from 1.5 to 50 Hz, a typical pulse rate being around 15 Hz.

As indicated above, where the field is applied using an electrode coated with an electrically insulated layer, the applied electric field is preferably a pulsed DC field, allowing the treatment of an emulsion having a relatively high dispersed phase content. However if uninsulated electrodes are to be used to apply the electric field, the field is preferably an AC field.

It is preferred that the emulsion is caused to flow through the electric field and the gas is introduced into the emulsion in such a way that the gas flow rate to emulsion flow rate ratio is preferably in the range 100:1 to 600:1, more preferably in the range 160:1 to 490:1 and most preferably in the range 300:1 to 360:1.

According to a second aspect of the present invention there is provided apparatus for use in separating the components of an emulsion comprising an electrically conductive component dispersed in a continuous phase of a substantially electrically insulating component, the apparatus comprising means for applying an electric or electrostatic field across the emulsion; and means for introducing bubbles of an electrically insulating gas into the emulsion whilst the electric or electrostatic field is being applied across the emulsion.

The means for applying the electric or electrostatic field will typically comprise a pair of electrodes, one at a relatively high, and one at a relatively low, voltage. It is preferably capable of applying a high voltage field which is more preferably a pulsed field.

The high voltage electrode may be coated with an electrically insulating layer. In this case, the apparatus is preferably used to apply a pulsed DC field across the emulsion, allowing for the treatment of an emulsion having a relatively high dispersed phase content. However, the electrodes may be uninsulated, in which case they are preferably used to apply an AC field.

The means for introducing the gas bubbles into the emulsion may take any convenient form, for instance one or more gas tubes capable of introduction into the emulsion and connected to a suitable gas supply such as a compressed air line.

The apparatus preferably comprises a suitably shaped separation vessel in which to contain the emulsion whilst its components are being separated. This separation vessel preferably contains the relatively low voltage electrode in a pair of electrodes forming part of the means for applying the electric or electrostatic field. The low voltage electrode may, for instance, take the form of a perforated element (for example, a disc or plate), of an electrically conductive material such as stainless steel, positioned inside the separation vessel and connected to earth.

The relatively high voltage electrode of the pair of electrodes may, for instance, comprise a secondary vessel positioned inside the separation vessel, the secondary vessel containing an electrolyte in contact with a voltage supply. In this way, an electric field may be set up between the electrolyte and another electrode contained within the separation vessel. Where the high voltage electrode is to be insulated, the secondary vessel is formed from an electrically insulating material such as polythene.

The apparatus preferably additionally comprises delivery means for introducing the emulsion to be separated into the separation vessel. The delivery means may, for instance, take the form of a delivery tube made from an electrically insulating material such as PTFE. The emulsion is preferably introduced into the separation vessel between the two electrodes of the means for applying the electric field. Where the apparatus includes a secondary vessel as an electrode inside the separation vessel, the emulsion is preferably introduced into the separation vessel at a point immediately adjacent the secondary vessel, between the secondary vessel and the other electrode.

The apparatus preferably additionally comprises means by which the separated components of the emulsion may be separately removed from the separation vessel.

The method and apparatus of the invention may be used for treating emulsions on a batch or a continuous basis.

Am embodiment of the present invention will now be described by way of example only and with reference to the accompanying illustrative drawing, FIG. 1, which shows schematically emulsion separating apparatus in accordance with the invention.

DETAILED DESCRIPTION OF THE DRAWING

Figure 1:
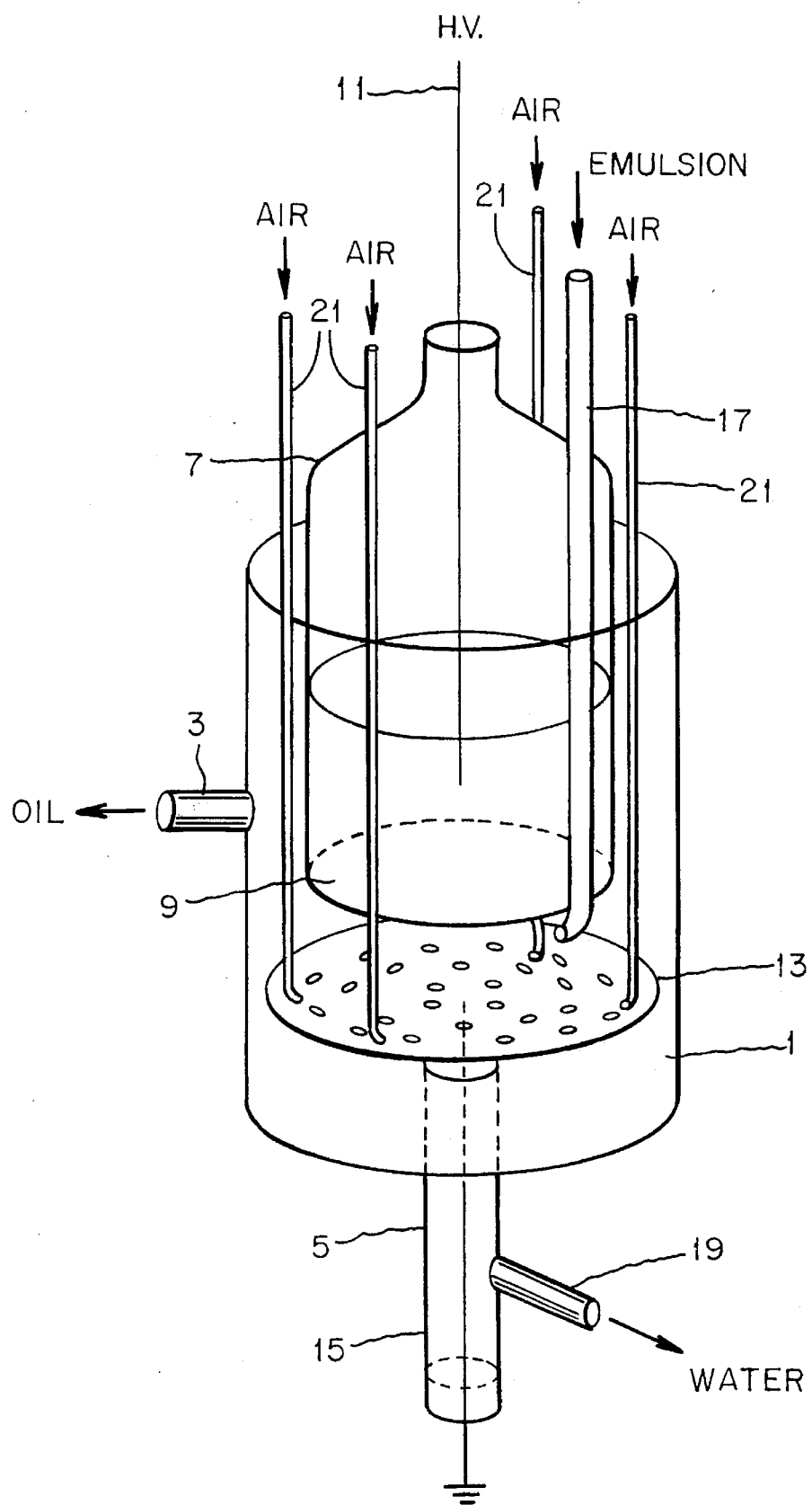

Referring to FIG. 1, apparatus in accordance with the present invention includes a cylindrical glass separation vessel 1 with a sidearm exit pipe 3. The separation vessel is open at the top and partially closed at the bottom to leave a central aperture connected to a pipe 5.

Arranged concentrically within the separation vessel is an electrode assembly 7 consisting of a clear thin-walled polythene bottle half-filled with an electrolyte 9. The electrolyte is in contact with a high voltage supply via a wire 11, so that the electrolyte 9 forms a high voltage electrode, insulated by the polythene bottle. Near the bottom of the separation vessel 1 is a horizontal perforated disc 13 of stainless steel which is supported by, and in electrical contact with, a stainless steel rod 15 which in turn is sealed in pipe 5 leading from the base of the separation vessel. The perforated disc 13 is the relatively low voltage electrode of the apparatus, and is connected to earth. The base of the polythene bottle electrode 7 and the disc 13 thus form a parallel electrode system.

In operation of the apparatus, a liquid water-in-oil emulsion, for example, may be passed into the vessel 1 through a delivery tube 17 made from an electrically insulating material, in this case PTFE. The emulsion enters the bulk fluid located in the vessel at a position immediately beneath the base of the bottle electrode 7. An electric field is applied between the high voltage bottle electrode and the lower, earthed, electrode 13.

The liquid emulsion located within vessel 1 is subjected to this electric field. Simultaneously, gas bubbles are introduced into vessel 1 through pipes 21. As a consequence, droplets of the heavier aqueous component of the water-in-oil emulsion are caused to coalesce and gravitate towards the bottom of the separation vessel. The aqueous component passes through the perforated disc 13 and forms an aqueous layer beneath it. The separated aqueous component is then drawn off by means of tube 19, and the remaining oil phase is drawn off through sidearm 3.

In one particular example, a stable water-in-oil test emulsion was prepared by using a high speed homogeniser to mix the aqueous phase into a kerosene which contained a non-ionic surfactant of HLB value 4.9. This Test emulsion contained 65% aqueous phase by volume and had a mean droplet size of approximately 2 μ. The emulsion was very stable. When allowed to separate at room temperature under normal gravity conditions, only 1.5% of the water dispersed in the emulsion resolved to form a water layer after one month.

The test emulsion was fed continuously to the apparatus of FIG. 1, and measurements were taken of the aqueous content of the effluent organic phase (removed via pipe 3) in order to determine percentage resolution of the emulsion. Results were obtained with and without the injection of air and these data are set out in Table 1 below.

TABLE 1

|  | Residence time* (min) | Operating temp (°C.) | Resolution (%) |
|---|---|---|---|
| Without air injection | 7.0 | 35.0 | 6.0 |
| With air injection | 7.0 | 35.0 | 70.0 |

*of emulsion in separation vessel, under influence of applied electric field.

Where air was introduced into the apparatus, it was supplied from a standard laboratory compressed air line, at a fairly steady supply rate. Excessive supply rates were found to cause mixing of the oil phase into the aqueous phase to a certain extent. The air was supplied at just above atmospheric pressure, the separation vessel 1 being open to the atmosphere at its upper end.

In both cases a pulsed DC electric field was applied to the emulsion, using a pulse rate of 15 Hz and a nominal voltage of 22 kV. The distance between the electrodes was 15 mm.

It is clear from Table 1 that introducing air has a dramatic effect on the extent of emulsion resolution achieved in an electric field. The invention thus allows for relatively high resolution rates to be achieved, even when using insulated electrode surfaces (e.g., when treating emulsions with relatively high water contents).

In a second example, a stable water-in-oil emulsion comprising by weight:

25 parts distilled water 11.5 parts kerosene 1 part Brij-52™ (diethylene glycol hexa decyl ether surfactant)

was electrically treated in a continuous flow experiment at a temperature of 30° C. In this case an emulsion flow rate of 20 ml/min was treated in the apparatus of FIG. 1 so that the residence time of the emulsion in the electric field was 15 minutes. Pulsed DC electric field was applied to the emulsion, using a pulse rate of 15 Hz and a nominal voltage of 22 kV. It was found that the percentage resolution of the emulsion was strongly influenced by the air flow rate and that there was an optimum air flow rate. The optimum condition gave 90% resolution for an air flow rate of 0.11 liter/s. The same experiment conducted with zero air flow gave 32% resolution. In order to achieve a 90% resolution of this emulsion with zero air flow it was necessary to reduce the emulsion flow rate to the apparatus from 20 ml/min to 6 ml/min.

I claim:

1. A method for separating components of a water-in-oil emulsion comprising an electrically conductive component dispersed in a continuous phase of a substantially electrically insulating component, the method comprising the steps of introducing bubbles of an electrically insulating gas into the water-in-oil emulsion, wherein the ratio of gas flow rate to emulsion flow rate is, at least, 100:1, while simultaneously applying a pulsed or alternating electric field across the water-in-oil emulsion.

2. A method according to claim 1 in which the electrically insulating gas is air.

3. A method according to claim 2 in which the ratio of air flow rate to the emulsion flow rate is in the range 100:1 to 600:1.

4. A method according to claim 2 in which the ratio of air flow rate to the emulsion flow rate is from 160:1 to 490:1.

5. A method according to claim 2 in which the ratio of air flow rate to the emulsion flow rate is in the range 300:1 to 360:1.

6. A method according to claim 1 in which the pulsed or alternating electric field is applied by means of one or more pairs of electrodes.

7. A method according to claim 6 wherein a pulsed unidirectional electric field is applied between a high voltage electrode and an electrode which is continuously at ground potential.

8. A method according to claim 7 wherein the high voltage electrode is separated from the water-in-oil emulsion by a layer of electrically insulating material.

* * * * *